United States Patent [19]

Weiss et al.

[11] Patent Number: 5,079,974
[45] Date of Patent: Jan. 14, 1992

[54] SPRAYED METAL DIES

[75] Inventors: Lee E. Weiss, Pittsburgh; Lawrence L. Schultz, Gibsonia, both of Pa.

[73] Assignee: Carnegie-Mellon University, Pittsburgh, Pa.

[21] Appl. No.: 705,321

[22] Filed: May 24, 1991

[51] Int. Cl.$^5$ ............... B21K 5/20; B21D 37/20; B22C 7/00
[52] U.S. Cl. ....................................... 76/107.1
[58] Field of Search ............ 76/107.1, 101.1, DIG. 6

[56] References Cited

U.S. PATENT DOCUMENTS

| | | | |
|---|---|---|---|
| 2,944,338 | 7/1960 | Craig | 76/107.1 |
| 3,533,271 | 10/1970 | Walkey et al. | 76/107.1 |
| 4,231,982 | 11/1980 | Jansson | 76/107.1 |

FOREIGN PATENT DOCUMENTS

| | | | |
|---|---|---|---|
| 0110139 | 6/1983 | Japan | 76/107.1 |
| 0034230 | 2/1990 | Japan | 76/107.1 |

Primary Examiner—Roscoe V. Parker
Attorney, Agent, or Firm—Ansel M. Schwartz

[57] ABSTRACT

A method for forming a sprayed metal die comprising the steps of first building a positive pattern of the die. Then, there is the step of spraying a first metal, having a first melting temperature, onto the pattern to form a first metal substrate. Next, there is the step of separating the pattern from the first metal substrate. Next, there is the step of spraying a second metal, having a second melting temperature higher than the first melting temperature, onto the first metal substrate to form a second metal substrate which bonds to the first metal substrate to resist shrinkage due to residual stress within the second metal substrate. Next, there is the step of heating the first and second substrates to a temperature higher than the first melting temperature, yet lower than the second melting temperature, to melt away the first metal substrate from the second metal substrate.

17 Claims, 1 Drawing Sheet

SPRAYED METAL DIES

FIELD OF THE INVENTION

The present invention is related to sprayed metal tooling. More specifically, the present invention is related to a method for resisting shrinkage of sprayed metal dies.

BACKGROUND OF THE INVENTION

As part of the complete design cycle, CAD representations must ultimately be converted into physical forms including prototype parts and tooling to manufacture the parts. The ability to quickly fabricate physical shapes, to minimize the time and cost required to reiterate designs, is one key to manufacturing competitiveness. A sprayed metal tooling system provides a method to rapidly build custom tooling directly from prototype patterns quickly produced, for instance, with stereolithography apparatus (SLA). The sprayed metal tooling process uses thermal spraying, for instance, electric arc spraying whereby metal wire is fed to a torch, melted in an electric arc, gas atomized, and sprayed onto a substrate surface. On contact, the sprayed material solidifies and forms a surface coating. Spray coatings can be built up by depositing multiple bonded layers which, when separated from the substrate, form a free-standing shell with the shape of the substrate surface. By mounting the shell in a frame, and backing it with appropriate materials, a die can be fabricated. For example, the cavities of prototype injection models can be fabricated by direct deposition of zinc metal onto plastic SLA models of the desired part and backing the frame shell with epoxy resins. Sprayed metal tooling is described more fully in U.S. Pat. No. 3,533,271 to Burbank et al.

Steel, however, cannot be effectively deposited by the sprayed metal tooling process. In practice, during the spraying of the molten steel, residual stress is created in the steel shell as it solidifies. This residual stress causes the steel to peel away from the substrate as new layers are applied. Not only steel but many other alloys with high melting temperatures exhibit this problem.

Zinc and zinc alloys, in contrast, can be sprayed to significant thicknesses with nominal shrinkage to form an accurate shell. Previous processes for making sprayed steel tooling required that release agents, such as PVA, first be applied to the patterns. The release agent helps to hold the sprayed metal in place. The patterns could be machined or made with solid-freeform-fabrication techniques. However, PVA is not effective in holding sprayed steel in place because of the extremely high residual stress associated with sprayed steel. Thus, sprayed steel tends to peel off the pattern after a thin layer has been built-up. In addition, PVA tends to burn-off when high melting point metals, such as steel, are sprayed onto it.

In the present invention, a low melting point metal is first sprayed onto the pattern. The low melting point metal can withstand the heat of the rapidly solidifying sprayed metal and, in fact, it helps conduct the heat away. More importantly, the low melting point metal clamps the steel down, by local anchoring, until a backing material can be poured to mechanically stabilize the sprayed shell. The present invention provides a method for accurately forming steel shells on a pattern, such as those produced with a stereolithography apparatus, by resisting shrinkage due to high residual stresses within the shell during a spray tooling process.

SUMMARY OF THE INVENTION

The present invention pertains to a method for forming a sprayed metal die comprising the steps of first building a positive pattern of the die. Then, there is the step of spraying a first metal, having a first melting temperature, onto the pattern to form a first metal substrate. Next, there is the step of separating the pattern from the first metal substrate. Then, there is the step of spraying a second metal, having a second melting temperature higher than the first melting temperature, onto the first metal substrate to form a second metal substrate which bonds to the first metal substrate to resist shrinkage due to residual stress within the second metal substrate. Next, there is the step of heating the first and second substrates to a temperature higher than the first melting temperature, yet lower than the second melting temperature, to melt away the first metal substrate from the second metal substrate.

In a preferred embodiment, the building step incudes the step of building the positive pattern by solid free-form fabrication, such as stereolithography. Preferably, after the building step, there is the step of mounting a first frame on the pattern and the step of spraying a first metal includes the step of spraying the first metal around an inside edge of the first frame. Preferably, after the separating step, there is the step of mounting a second frame onto the first metal substrate and the step of spraying a second metal includes the step of spraying the second metal around an inside edge of the second frame.

In a more preferred embodiment, before the separating step, there is the step of pouring a first backing material onto the first metal substrate to support it. Preferably, the first backing material is comprised of epoxy. Alternatively, the backing material can be the first metal and is formed by continual spraying until it is built up to the proper thickness. Furthermore, before the spraying a first metal step, there is the step of applying a releasing agent to the pattern. Preferably, the releasing agent is polyvinyl alcohol. It is also preferable after the step of spraying a second metal, the step of pouring second backing material onto the second metal substrate to support it.

In an even more preferred embodiment, before the second pouring step, there is the step of orienting cooling channels about the second metal substrate. Further, the second backing material is comprised of an opposite backing material, such as a castable material, for instance, epoxy or ceramic.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1A:
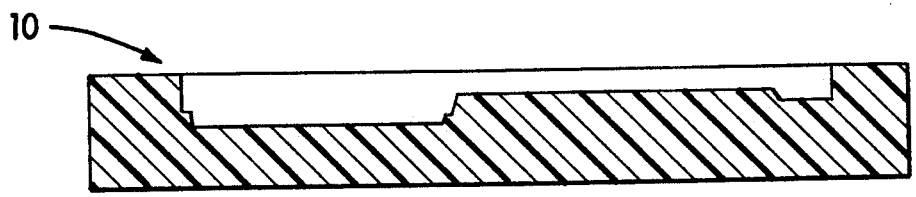
FIGS. 1a–1e are schematic representations showing a first embodiment of the sprayed metal die process of the present invention.

Referring now to the drawings wherein like reference numerals refer to similar or identical parts throughout the several views, and more specifically to FIG. 1 thereof, there is shown a method for forming a sprayed metal die. The method comprises the steps of first building a positive pattern 10 of the die. Then, there is the step of spraying a first metal 12, having a first melting temperature, onto the pattern 10 to form a first metal substrate 14. Next, there is the step of separating the pattern from the first metal substrate 14. Then, there is the step of spraying a second metal 16, having a second melting temperature higher than the first melting temperature, onto the first metal substrate 14 to form a second metal substrate 18 which bonds to the first metal substrate 14 to resist shrinkage due to residual stress within the second metal substrate 18. Next, there is the step of heating the first and second substrates, 14 and 18, to a temperature higher than the first melting temperature, yet lower than the second melting temperature, to melt away the first metal substrate 14 from the second metal substrate 18. The heating step can be accomplished with the use of a torch or placing the first and second substrates 14, 18 into a furnace.

In a preferred embodiment, the pattern 10 is built by solid freeform fabrication, such as stereolithography. After the building step, there is preferably the step of mounting a first frame 20 on the pattern 10. Preferably, the step of spraying a first metal 12 includes the step of spraying the first metal 12 around the inside edge 22 of the first frame 20. Preferably, after the separating step, there is the step of mounting a second frame 24 onto the first metal substrate 14. Preferably, the step of spraying a second metal 16 includes the step of spraying the second metal 16 around the inside edge 26 of the second frame 24. Next, before the separating step, there is the step of pouring a first backing material 28 onto the first metal 12 to support it. Preferably, the backing material 28 is comprised of epoxy 30. Further, there is a step of applying a releasing agent 32 to the pattern 10, before the step of spraying a first metal 12. Preferably, the releasing agent 32 is PVA (polyvinyl alcohol), although, for instance, teflon can also be used.

In a further preferred embodiment, after the step of spraying the second metal, there is the step of pouring a second backing material 34 onto the second metal substrate 18. The second backing material 34 can be any appropriate material that will serve as backing. Preferably, the second backing material 34 is comprised of an epoxy or chemically bonded ceramic 36. Furthermore, before the pouring of a second backing material 34, there is preferably the step of orienting cooling channels 38 about the second metal substrate 18.

If a die requires two halves, then the above described process can be used to form a first die half and the complete die is made by forming a mating die half with the first die half. Preferably, this is accomplished by repeating the above steps used to form the first die half to form the mating die half.

In the operation of the preferred embodiment, a positive pattern 10 of the die is constructed using the process of stereolithography. Stereolithography, is well known in the art, and is a process which quickly constructs plastic prototypes of arbitrary geometric complexity directly from the computer models of the parts or dies. In this manner, stereolithography is used to build a positive pattern 10 of the desired die part in plastic. Further information on using stereolithography to produce patterns 10 is disclosed in *Advances in Manufacturing Systems Engineering*, ASME, Winter Annual Meeting, 1989.

A first frame 20 of aluminum or carbon steel is then constructed and mounted onto the pattern 10. A release agent of polyvinyl alcohol (PVA) is then applied to the pattern 10 and frame 20. Next, a first metal 12 is sprayed onto the pattern 10 to form a first metal substrate 14. The first metal 12 has a first melting temperature which is greater than that of the plastic pattern 10.

Figure 1B:
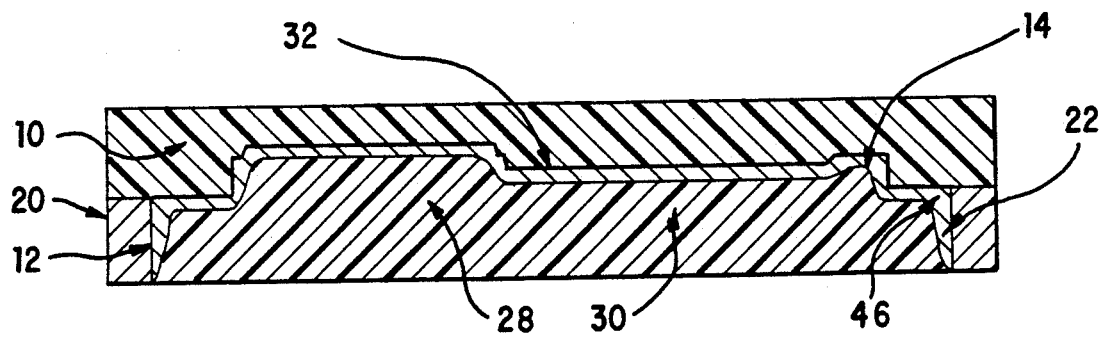
Figure 1C:
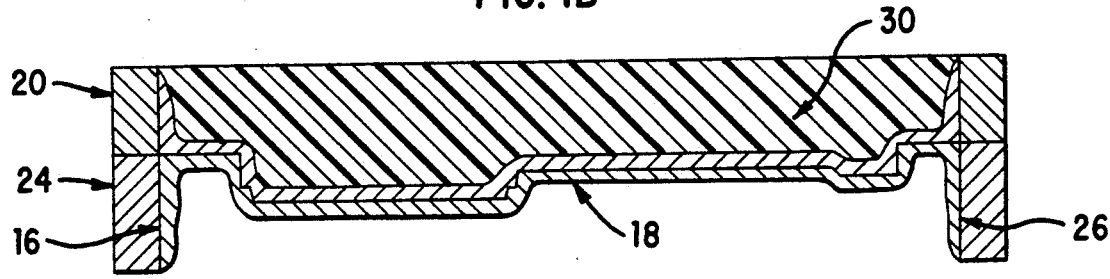
Figure 1D:
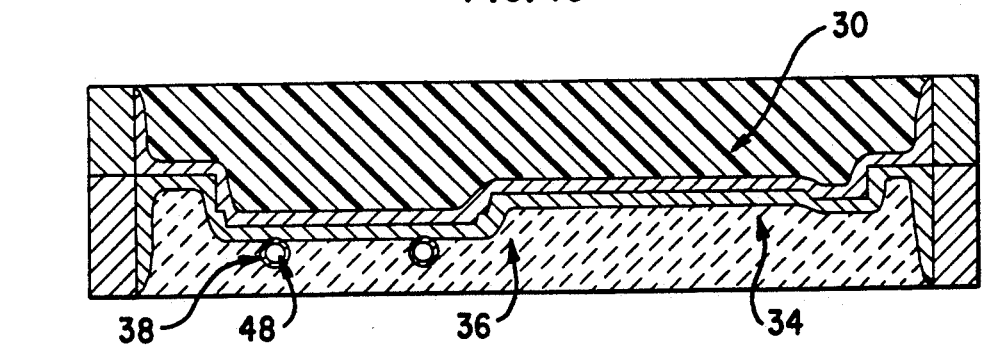
Figure 1E:
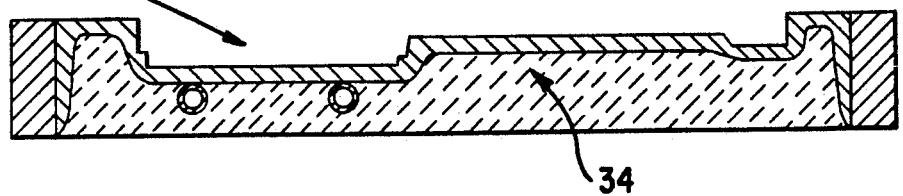

Cerro metal alloys, manufactured by Cerro Metal Products Co., P.O. Box 388, Bellefonte, Pa. 16823, were found as suitable materials for the first metal 12. Cerro metal has a melting temperature between 150° F. and 340° F. and is sprayed onto the pattern using a thermal spray gun whereby Cerro metal is melted, atomized and sprayed onto the pattern 10. On contact, the sprayed Cerro metal solidifies and forms a substrate 14 which is comprised of Cerro metal. As shown in FIG. 1b, the Cerro metal is sprayed around the inside edge 26 of the aluminum frame 20 to form a lip 46 which serves to support the frame 20. Electric arc spraying is well known in the art, and is fully explained in *New Die Making Technique*, SPE Journal, 27(5), May 1989. Spraying Cerro metal to a thickness of at least 1 mm was found to be sufficient.

Next, epoxy 30 is poured onto the substrate 14 of Cerro metal and within the frame 20 to form a backing material. After the epoxy 30 sets, the substrate 14 is separated from the pattern 10. The PVA allows for easy separation. The epoxy 30 supports the substrate 14 of Cerro metal as it is separated from the pattern 10. Next, a prefabricated second frame 24 is mounted onto the substrate 14. The frame 24 is preferably comprised of steel and rests on frame 20 as shown in FIG. 1b. A clamp (not shown) is used to hold the frame 20 to frame 24. Next, steel is sprayed onto the first substrate 14 of Cerro metal and within frame 24 to form a second metal substrate 18 comprised of steel. The steel must be applied in thin layers and allowed to sufficiently cool between layers so as not to overheat the substrate 14 of Cerro metal. The steel is applied to a thickness of approximately 0.75 mm.

The sprayed steel anchors to the surface 52 of the Cerro metal by superficially melting and abrading the surface 52. This anchoring prevents the second substrate 18 from shrinking due to the residual stress created as the steel cools. The first substrate 14 of Cerro metal, therefore, serves to shape the sprayed steel and anchor it to the pattern 10.

Next, copper tubing 48 is oriented about the substrate 18 of steel, to form cooling channels 38. The cooling channels 38 improve the heat transfer properties of the finished die 50 which is necessary during the casting of aluminum or injection molding. Next, a backing of a chemically bonded ceramic 36 or epoxy is poured onto the second substrate 18 of steel to encase the copper tubing 48 and to substantially fill the frame 24. The ceramic 36 serves to support the second substrate 18 during the operation of the die 50. Finally, the first substrate 14 of Cerro metal and the second substrate 18 of steel are heated to at least the melting temperature of the Cerro metal (150°-340°) to melt away the Cerro metal from the steel. The frame 20 of aluminum can then be removed, leaving behind the desired die 50 comprised of the second steel substrate 18, backed by ceramic 36 and surrounded by the steel frame 24.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for forming a sprayed metal die comprising the steps of:
   building a positive pattern of the die;
   spraying a first metal, having a first melting temperature, onto the pattern to form a first metal substrate;
   separating the pattern from the first metal substrate;
   spraying a second metal, having a second melting temperature higher than the first melting temperature, onto the first metal substrate to form a second metal substrate which bonds to the first metal substrate to resist shrinkage due to residual stress within the second metal substrate; and
   heating the first and second substrates to a temperature higher than the first melting temperature, yet lower than the second melting temperature, to melt away the first metal substrate from the second metal substrate to form the die.

2. A method as described in claim 1 wherein the building step includes the step of building the positive pattern by solid freeform fabrication.

3. A method as described in claim 2 wherein the building step includes the step of building the positive pattern by stereolithography.

4. A method as described in claim 3 including after the building step, the step of mounting a first frame on the pattern; and wherein the step of spraying a first metal includes the step of spraying the first metal around an inside edge of the first frame.

5. A method as described in claim 4 including after the separating step, the step of mounting a second frame onto the first metal substrate; and wherein the step of spraying a second metal includes the step of spraying the second metal around an inside edge of the second frame.

6. A method as described in claim 5 including before the separating step, the step of pouring a first backing material onto the first metal substrate to support it.

7. A method as described in claim 6 wherein the first backing material is epoxy.

8. A method as described in claim 7 which includes before the spraying a first metal step, the step of applying a releasing agent to the pattern.

9. A method as described in claim 8 wherein the releasing agent is comprised of polyvinyl alcohol.

10. A method as described in claim 9 which includes after the spraying a second metal step, the step of pouring a second backing material onto the second metal substrate to support it.

11. A method as described in claim 10 which includes before the second pouring step, the step of orienting cooling channels about the second metal substrate.

12. A method as described in claim 11 wherein the second backing material is comprised of a chemically bonded ceramic or epoxy.

13. A method as described in claim 1 wherein the die is a first die half; and including after the heating step, the step of forming a mating die half with the first die half.

14. A method as described in claim 13 wherein the step of forming the mating die half includes the steps of:
   building a positive pattern of the mating die half;
   spraying the first metal onto the pattern to form a third metal substrate;
   separating the pattern from the third metal substrate;
   spraying the second metal onto the third metal substrate to form a fourth metal substrate which bonds to the third metal substrate to resist shrinkage due to residual stress; and
   heating the second and third substrates to a temperature higher than the first melting temperature, yet lower than the second melting temperature to melt away the third metal substrate from the fourth metal substrate to form the mating die half.

15. A method as described in claim 5 including before the separating step, the step of spraying continually the first metal to form a backing to support the first metal substrate.

16. A method as described in claim 15 which includes before the spraying a first metal step, the step of applying a releasing agent to the pattern.

17. A method as described in claim 16 which includes after the spraying a second metal step, the step of pouring a second backing material onto the second metal substrate to support it.

* * * * *

UNITED STATES PATENT AND TRADEMARK OFFICE
CERTIFICATE OF CORRECTION

PATENT NO. : 5,079,974

DATED : January 14, 1992

INVENTOR(S) : Lee E. Weiss, et al

It is certified that error appears in the above-identified patent and that said Letters Patent is hereby corrected as shown below:

```
Column 3, line 5, after "pattern" insert -- 10 -- .

Column 4, line 29, replace "1b" with -- 1c -- ;

Column 4, line 38, after "surface" delete "52";

Column 4, line 40, after "surface" delete "52".
```

Signed and Sealed this

First Day of June, 1993

*Attest:*

*Attesting Officer*

MICHAEL K. KIRK

*Acting Commissioner of Patents and Trademarks*